(No Model.)
E. T. STARR.
MECHANISM FOR CHARGING SECONDARY BATTERIES.
No. 359,901. Patented Mar. 22, 1887.
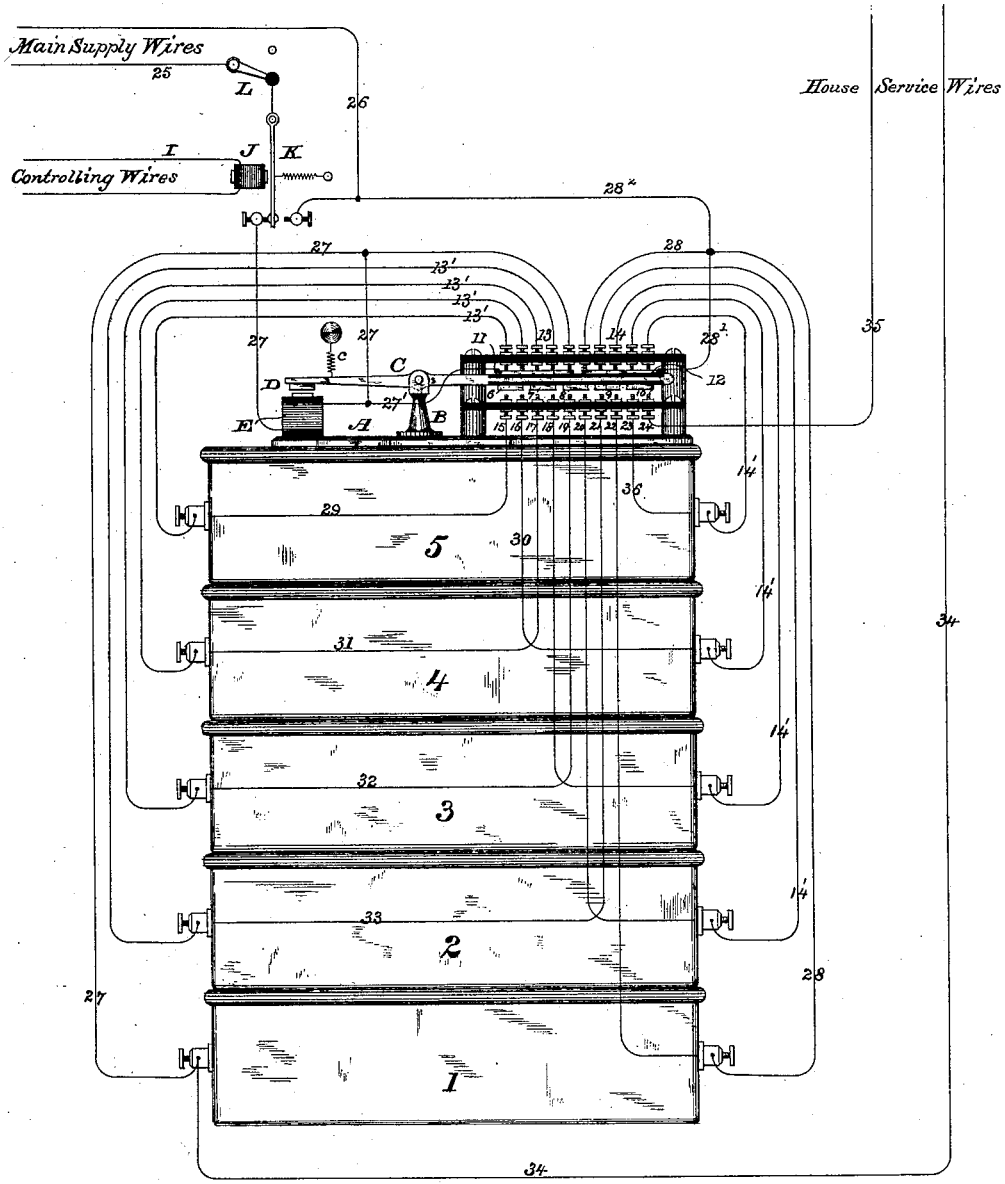
WITNESSES
Wm A. Skinkle
H. W. Elmore
INVENTOR
Eli T. Starr,
By his Attorney Wm J. Peyton.

UNITED STATES PATENT OFFICE.

ELI T. STARR, OF PHILADELPHIA, PA., ASSIGNOR, BY MESNE ASSIGNMENTS, TO THE ELECTRICAL ACCUMULATOR COMPANY, OF NEW YORK.

MECHANISM FOR CHARGING SECONDARY BATTERIES.

SPECIFICATION forming part of Letters Patent No. 359,901, dated March 22, 1887.

Application filed December 4, 1882. Serial No. 78,342. (No model.)

*To all whom it may concern:*

Be it known that I, ELI T. STARR, of the city and county of Philadelphia, in the State of Pennsylvania, have invented certain new and useful Improvements in the Art of and Mechanism for Charging and Discharging Secondary Batteries, of which the following is a specification.

My invention relates to improvements in the art of and mechanism for charging and discharging secondary batteries, whereby a series of batteries or secondary cells are charged in multiple arc or by branch wires and discharged in tension series for intensity. The advantage in certain instances of this method of charging and discharging secondary batteries has already been perceived, and complicated methods and contrivances have been devised to attain the ends desired.

The objects of my present invention are, first, to provide a simple method of charging secondary batteries in multiple arc, which ends I attain by utilizing the charging-current to produce electro-magnetism and causing said magnetism thus produced to control the charging operation; second, to charge a series of batteries in multiple arc and discharge them in tension series while breaking the working-circuit of said batteries during the time of charging, whereby the safety of the working-circuit is insured by avoiding all danger of currents of high tension from the charging-circuit passing over said working-circuit during the charging operation, and at the same time unauthorized use of the charging-current over said working-circuit at the time of charging is prevented; third, to provide simple mechanism, whereby to charge a series of secondary batteries in multiple arc and discharge them in tension series, and, fourth, to provide a simple organization of mechanism, whereby to charge a series of secondary batteries in multiple arc, break the working-circuit of said batteries during the charging operation and discharge said batteries in tension series over said working-circuit.

The improvements in the art I have invented and the best way known to me of carrying said improvements into effect will be hereinafter fully described in detail, while the subject-matter claimed herein is particularly pointed out at the close of the specification.

In the accompanying drawing I have shown a view, in elevation, of a series of secondary batteries and the circuit-controlling devices thereof, a diagrammatic illustration being also afforded of the charging-circuit connections and of the working-circuit connections of the batteries.

The present improvements are especially useful in a system of electric lighting and power-distribution by means of secondary batteries invented jointly by Wm. J. Peyton, of Washington, D. C., and myself, and patented to us July 4, 1882, as No. 260,624, and July 18, 1882, as No. 261,490. In our system we arrange at intervals along a main or charging line independent secondary batteries or groups of batteries, each battery or group of batteries having an independent working-circuit. For electric lighting each house or place to be lighted will have its battery or group of batteries, and in the working-circuit thereof are included the lamps or other apparatus to be worked by the energy of the charged batteries. These independent batteries are charged at intervals by the current of the main or charging line, and are then cut out to constitute independent sources of electric supply.

In some instances it is desirable to charge the set or group of batteries of each house or place at which they may be located in multiple arc and discharge them over their working-circuits in tension series, so as to obtain a working-current for the working-circuit of comparatively high intensity.

The advantages and benefits to be derived by this method of charging and discharging secondary batteries is to some extent already known to those electricians especially familiar with secondary batteries, and I will therefore content myself with a description of my improved method of charging and discharging and of the mechanism I have shown for carrying my invention into effect.

A set or group of batteries, 1 2 3 4 5, (five in number,) is shown in the present example, and they are placed one on top of the other in the form of a pile. On top of the uppermost battery in the organization shown I mount a base-board, A, which is provided with a post, B, in the upper end of which is pivoted a beam or lever, C, carrying at one end an armature, D, and at the other end separately insulated metallic contact-pieces 6 7 8 9 10 on the under surface of the lever and separately-insulated contact-plates 11 12 on the upper surface thereof. The vibration or rocking movement of the lever C on its pivotal connection is limited in one direction by contact of the plates 11 12 with two sets of contact-screws or binding-posts, 13 14, and in the other direction by contact of the contact-pieces 6 7 8 9 10 with separately-insulated contact-pieces or binding-screws 15 16 17 18 19 20 21 22 23 24. The normal position of the lever C is with its contact-pieces 6 7 8 9 10 in contact with the binding-screws or contact-pieces 15 to 24, inclusive, above mentioned, and this position is preferably maintained wholly or partially by an adjustable spring, $c$, which exerts its action to draw up the armature end of the lever and carry down the opposite or contact end thereof. Opposed to the armature D of the lever C is an electro-magnet, E, included in the main or charging circuit.

When the charging-current is flowing over the main or charging circuit 25 26, and said circuit is completed to the batteries, the magnet E is energized or excited by the current which flows over wire 27, through battery No. 1, and wire 28 $28^2$ back to 26, and draws down the armature D, thereby rocking the lever C, and raising its contact-plates 11 12 in contact with their respective sets of contact-screws 13 14, and consequently closing the main or charging circuit through the several batteries 1 2 3 4 5 in multiple arc, by way of the wire $27^1$, contact-plate 11, contact-screws 13, and wires $13^1$ 27, the current being returned to the main wire 26 by the respective wires $14^1$ and 28, contact-screws 14, contact-plate 12, wire $28^1$, and wire $28^2$. The charging operation is continued for the requisite time, and the main circuit through the batteries is then cut off, whereupon the magnet will be no longer excited, the armature D will be released, and the lever C will be returned by its spring $c$ to its normal position with its contact-plates 6 7 8 9 10 in contact with the contact-screws 15 to 24, inclusive, so as to permit of the discharge or utilization of the current of the batteries. It will be understood, of course, that during the charging operation the working-circuit is broken by the raising of the contact end of the lever C by the action of the electro-magnet upon the armature D.

The discharge of the set or group of batteries takes place in tension series over the working-circuit (indicated by the words "house-service wires") as follows: From the positive pole of battery No. 5 over wire 29 to binding-screw 15, contact-piece 6, binding-screw 16, and wire 30 to the negative pole of battery No. 4; then through said battery No. 4 to the positive pole thereof, and by way of wire 31, binding-screw 17, contact-piece 7, and binding-screw 18 to the negative pole of battery No. 3; then through said battery No. 3 to the positive pole thereof, and by way of wire 32, binding-screw 19, contact-piece 8, and binding screw 20 to the negative pole of battery No. 2; then through said battery No. 2 to the positive pole thereof, and by way of wire 33, binding-screw 21, contact-piece 9, and binding-screw 22 to the negative pole of battery No. 1; then through said battery No. 1 to the positive pole thereof, and from thence over the working-circuit or house-service wires 34 and 35 back to the negative pole of battery No. 5, by way of the binding-screw 24, contact-piece 10, binding-screw 23, and wire 36.

The working circuit-wires 34 35 are, of course, run throughout the house, or to the place required, and are of course in electrical connection to complete the working circuit, which circuit may include the apparatus to be operated, and may be provided with the usual or necessary switches and other parts.

The batteries may be charged at intervals, as contemplated in the system patented, as aforesaid, say, for instance, once every twenty-four hours, and in order to throw one or different groups of batteries into the charging-circuit and cut them out from a distance—from a central station, for example—at the desired times, I may employ an independent circuit, I, including electro-magnets J, to control suitable armature-switches, K, forming part of the main or charging circuit. I may also employ a manual cut-out switch, L, for each house or group of batteries. These electro-magnetic switch-controlling devices and manual switches or cut-outs are fully described in the patents aforesaid, and are not claimed herein.

I claim herein as my invention—

1. The combination of a series of secondary batteries, a working-circuit in which they are connected in series, a charging-circuit, an electro-magnet in said circuit, a series of contacts, and a switch or circuit charger actuated by said magnet whenever the charging-circuit is closed to disconnect said batteries from the working-circuit and connect them with the charging-circuit, substantially as described.

2. The combination of a series of secondary batteries, a working-circuit in which said batteries are connected in series, a charging-circuit, an electro-magnet included in said circuit, a lever actuated by said magnet, and a series of contact devices controlled by said lever, whereby, when the latter is actuated by said magnet, the connections of the working-circuit are broken and the said batteries connected with said charging-circuit in multiple arc, substantially as described.

3. The combination, substantially as hereinbefore set forth, of a series of secondary cells, a charging-circuit, a vibrating lever carrying a series of contact or make-and-break devices, and circuit-connections, substantially as described, whereby, when said lever is in one position the cells are charged in multiple arc and when in another position the discharge thereof is effected in tension series.

4. The combination, substantially as hereinbefore set forth, of a series of secondary batteries or storage-cells, a charging-circuit, an electro-magnet included in said circuit, and mechanism controlled by said magnet whereby the batteries are charged in multiple arc and discharged in tension series.

5. The combination of a series of secondary batteries or cells, a series of contact devices through which said cells are charged in multiple arc, a series of contact devices through which said batteries are discharged in tension series, and a vibrating lever making contact at one side when in one position with said multiple-arc contact devices and at the other side when in another position with said tension-series contact devices, substantially as described.

In testimony whereof I have hereunto signed my name.

ELI T. STARR.

Witnesses:
 WM. J. PEYTON,
 E. V. BROWN.